Dec. 2, 1969   E. LENK   3,480,995
SEALING DEVICE FOR THE CONNECTING POINT BETWEEN FEEDING
MEMBER AND TOOL IN EXTRUSION PRESSES
Filed April 6, 1967
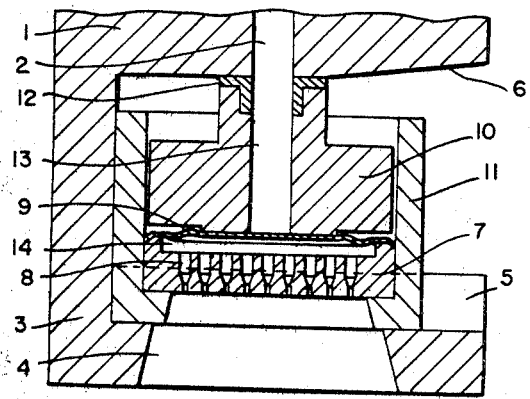
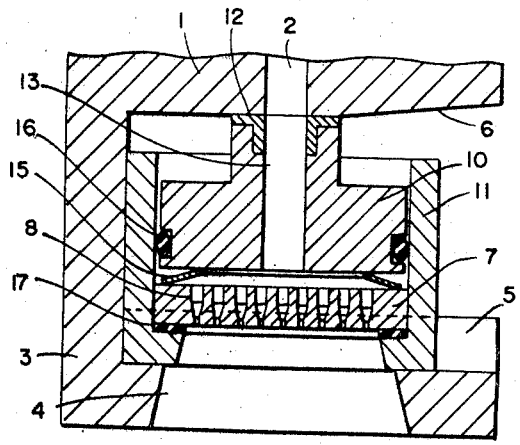
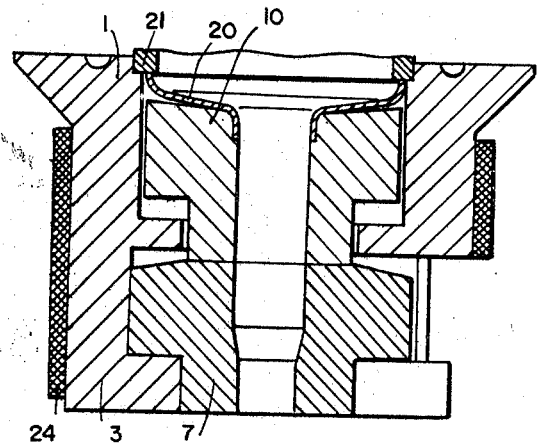
INVENTOR:
ERICH LENK
BY
Marzall, Johnston, Cook & Root
ATT'YS 3,480,995
SEALING DEVICE FOR THE CONNECTING POINT BETWEEN FEEDING MEMBER AND TOOL IN EXTRUSION PRESSES
Erich Lenk, Remscheid-Lennep, Germany, assignor to Barmag Barmer Maschinenfabrik AG, Wuppertal, Germany
Filed Apr. 6, 1967, Ser. No. 628,913
Claims priority, application Germany, Apr. 9, 1966, B 86,620
Int. Cl. D01d 5/00
U.S. Cl. 18—8                                                   5 Claims

ABSTRACT OF THE DISCLOSURE

The invention disclosed herein consists of a means for sealing the connecting point between the feeding member and the exit tool in an extrusion press, and more particularly in extrusion presses utilized for spinning plastic masses; said means being comprised of a nozzle element, a diaphragm, a piston with a central bore, the sealing areas at the connection point and a mounting in the form of a tool retaining chuck, these components being arranged such that:
(a) a pre-load is generated at the connecting point thereby creating an adequate seal at low melt pressures,
(b) an increase in the melt pressure is utilized to increase the area pressure at the connecting point resulting in a corresponding increase in the effectiveness of the seal, and
(c) the pre-load generated at the connecting point eliminates the necessity for fastening the exit tool to the feeding member thereby facilitating exchange of the tool.

---

This invention relates to extrusion presses and more particularly to the apparatus necessary to seal the connecting point between the feeding member and the exit tool.

In extrusion presses, especially those used for spinning plastic masses, a positive seal at the connecting point between the individual parts at the exit end of the press is important because the mass being processed is under a high pressure in the area of the exit tool. Furthermore, at or near the connecting point, heating devices are used in nozzles, tool packages and other parts to maintain the plastic state of the material, and where the spinning of threadlike materials is required, dosing devices as well as pressure generators are similarly employed to produce a substantially constant product.

Previous methods for sealing such connecting points had a package of nozzles, a hole plate, a filter and sieve plate and other tool elements mounted by screws against the feeding member. This package is pressed by the screws against the feeding member, but such an arrangement has the disadvantage that the exchange of the tool is quite inconvenient and time consuming. Often the screws are not tightened evenly thereby creating an uneven seal area. The pressure of the mass works against the screw tension and therefore relieves the area force of the seal. The result is a leakage at the connecting point and a dangerous condition at the work stations.

It has also been suggested that the pressure of the plastic mass could be used to increase the area pressure at the sealing point between the tool elements. In such a device the tool elements are pressed together in a housing. The housing or chuck had to be pressed with its entry end against the exit end of the feeding member. This was done by screws. The entry end also had to be sealed against the high pressure. This arrangement also has the above mentioned disadvantages.

The object of this invention is to provide a device for the exit end of an extrusion press which allows an easy exchange of the tool and seals the tool positively against the feeding member in a nondangerous manner.

In general, the present invention consists of the discovery of a new device for sealing the connection point between the feeding member and the exit tool in an extrusion press. More particularly, the device consists of a nozzle element, a diaphragm, a piston, the sealing areas at the connection and the feeding member. The piston and feeding member or tool chuck are bored for a melting passage. The sealing point to be sealed is either between the feeding element and the piston or between the piston and nozzle element. The diaphragm is fastened at its outer diameter and positively tight to the mating elements. It also generates the required pre-load at the point of the connection so that the entering mass seals the tool sufficienly at this point. A disc spring or belleville spring can also be used instead of the diaphragm which is joined to the mating parts. The use of a disc spring requires another seal for the ring gap between the outer piston envelop and the tool chuck.

With this device it is possible to increase the pressure against the sealing area in proportion to the pressure of the mass. The previously used method of fastening the tool to the feeding member made the connection elements elongate and thereby caused a decrease in area pressure at the connection point. In this way it is very difficult to obtain a positive connection at high pressures. In the new method, the pre-load of the diaphragm creates a sufficient sealing pressure until the mass pressure is sufficient to seal itself. The pressure of the mass against the area of the piston or diaphragm is to be greater than the force generated by the sealing area.

One arrangement of the device suggests that the entry of the mass from the feeding element to the tool can be such that the mass enters at the side which is opposite to the side where the finished product leaves. In this way the mass flows through the tool in a nearly straight line. It is also possible to arrange the connecting point so that the mass moves through the tool in the form of an arc.

Another form of design of the device employs a spring element with the piston in the feeding element. In this case the easily exchanged tool consists only of the nozzle element itself.

Still another design according to this invention provides a beveled surface on one of the surfaces of the feeding element which is basically in a position of a right angle relative to the flow of the mass. This beveled surface can also be on the tool or the chuck and is designed to facilitate a quick and easy exchange of the tool or tool chuck. The bevel acts as a wedge and creates the pre-load on the spring element.

It is also suggested that, in installations where several extrusion tools are fed by a single extrusion press, one piston element be provided for several tools side by side or one piston element for each tool in such a side by side arrangement.

The invention can best be understood by reference to the attached illustrative and schematic drawings in which:

FIG. 1 is a cross-section through the feeding member and tool at a spinning point with one diaphragm;

FIG. 2 is a cross-section through a similar spinning point with a disc spring as spring element; and FIG. 3 is a cross-section through a heated extrusion tool.

The device as shown in FIG. 1 consists of a feeding element 1 with feeding passage 2 and tool holder 3. The tool holder 3 can either form one unit with the feeding member 1 or can also exist as a separate part and be connected to the feeding member 1. The tool holder 3 has a passage 4 and two guide rails 5, one of which is shown in the drawing. The bottom side of the feeding member 1 is provided with a bevel 6. The nozzle element 7 has a number of openings 8. The tool chuck 11 serves as retainer for the nozzle element 7, the diaphragm element 9 and the piston element 10. The chuck also serves as an axial guide for the piston element 10. Between the upper ring shaped face of the piston 10 and the bottom side of the feeding member 1 is the seal element 12.

The outer circumference of the diaphragm 9 is soldered together with the nozzle plate 7 and the edge of the central bore is soldered to the circumference of the bore 13 of the piston 10. This connection can be soldered, brazed or welded. Filter or sieve plates can be inserted in the bore 14 of the nozzle plate 7. The diaphragm 9 is without tension before the tool insert 11 is mounted in the tool holder 3. When the tool insert 11 is moved between the parallel guides 5, the sealing element 12 slides along the bevel 6 until the feeding passage 2 and the piston bore 13 align with one another. In this position of the device the diaphragm 9 is dished toward the bottom because of the reduced distance between the under side of the feeding element 1 and the contact surface of the tool chuck 11 resulting from the bevel 6. Therefore the diaphragm is pre-loaded, and the seal 12 is pressed against the face of the upper ring shaped surface of the piston 10 which is in a parallel plane with the area of the feeding member 1. As is apparent from the drawing, the piston area is substantially larger than the sealing surface at the connection point. Insmuch as the piston area and the sealing area are placed under the same mass pressure, the sealing force is more than enough to prevent leakage.

In the device shown in FIG. 2, the pre-load of the piston element 10 against the sealing point is created by a disc spring 15. The chamber in front of the nozzle is sealed by the seals 16 and 17. The sealing effect of both seals increases with increasing pressure.

In the devices shown in FIGS. 1 and 2, the plastic mass passes first through the connecting point between the feeding element 1 and the piston element 10. The pressure in the mass builds up just ahead of the nozzle plate 8 and reacts as a sealing force on the piston element 10.

According to FIG. 3, the feeding member 1 serves as retainer for the piston element 10. Mounted on the piston 10 is the dishlike seal element 20. This contacts with its larger diameter on the bracing element 21. The piston element 10 is pressed with a light pressure against the nozzle element 7 because of the elasticity of the dishlike sealing element 20. Ground contact surfaces of the piston 10 and the nozzle element 7 provide a sufficiently good seal even without the use of a special seal. The feeding element 1 and part of the tool holder 3 are equipped with a heating device 24.

The devices shown in FIGS. 1 and 2 can also be heated. In this case, all the devices shown feature good heat transfer from the mounting 3 to the nozzle opening 8 because the mass pressure in the chamber ahead of the nozzle element 7 presses the nozzle element 7 with the tool chuck 11 tight against the tool holder 3.

Obviously many modifications and variations of the invention as hereinbefore set forth may be made without departing from the spirit and scope thereof, and therefore only such limitations should be imposed as are indicated in the appended claims.

I claim:
1. A device for sealing the connection point between a feeding member and an exit tool in extrusion presses which comprises: a piston element containing a passage through which fluid material is passed from said feeding member to said exit tool, a seal area in contact with said piston element at the connection point between said exit tool and said feeding member in said extrusion press; means for applying a pre-load on said piston whereby said piston is held in contact with said seal area; and means for increasing the pressure of said piston against said seal area when fluid is passed through said piston to said exit tool by pressure.

2. A device as in claim 1 in which the surface of the piston acted upon by the fluid material is greater than the surface of the piston in contact with said seal area.

3. A device as in claim 1 wherein said pre-load is generated by a spring element, the pre-load providing a pressing force at the seal area.

4. A device as in claim 1 which is characterized by a mass feeding flow to the tool in a direction parallel or lateral to the exit direction of the finished product.

5. A device as in claim 1 which includes a connecting surface outside of the sealing plane which slants relative to the sealing plane.

References Cited

UNITED STATES PATENTS 2,879,543  3/1959  McDermott.
2,891,278  6/1959  Cook.
2,958,097  11/1960  Simpson et al.

FOREIGN PATENTS 650,067  7/1966  Netherlands.

WILLIAM J. STEPHENSON, Primary Examiner